(12) United States Patent
Frenne et al.

(10) Patent No.: US 10,887,062 B2
(45) Date of Patent: Jan. 5, 2021

(54) METHODS AND SYSTEMS FOR PROVIDING CHANNEL ESTIMATION

(71) Applicant: Telefonaktiebolaget LM Ericsson (publ), Stockholm (SE)

(72) Inventors: Mattias Frenne, Uppsala (SE); Håkan Andersson, Linköping (SE); Johan Furuskog, Stockholm (SE); Johan Kåredal, Lund (SE); Niclas Wiberg, Linköping (SE); Qiang Zhang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/093,736

(22) PCT Filed: Nov. 29, 2016

(86) PCT No.: PCT/SE2016/051179
§ 371 (c)(1),
(2) Date: Oct. 15, 2018

(87) PCT Pub. No.: WO2017/180037
PCT Pub. Date: Oct. 19, 2017

(65) Prior Publication Data
US 2019/0123870 A1    Apr. 25, 2019

Related U.S. Application Data
(60) Provisional application No. 62/322,835, filed on Apr. 15, 2016.

(51) Int. Cl.
H04W 24/10        (2009.01)
H04L 5/00         (2006.01)
(Continued)

(52) U.S. Cl.
CPC .......... H04L 5/0048 (2013.01); H04B 7/068 (2013.01); H04B 7/0617 (2013.01);
(Continued)

(58) Field of Classification Search
CPC .... H04W 24/10; H04B 7/0617; H04L 5/0048; H04L 27/2605
See application file for complete search history.

(56) References Cited

U.S. PATENT DOCUMENTS 5,751,708 A *  5/1998  Eng ................... H04L 12/2801
                                                        370/310.1
2013/0156120 A1  6/2013  Josiam et al.
(Continued)

FOREIGN PATENT DOCUMENTS

JP    2015509305 A    3/2015
JP    2015510322 A    4/2015
(Continued)

OTHER PUBLICATIONS

International Search Report and Written Opinion dated Feb. 24, 2017 issued in International Application No. PCT/SE2016/051179. (10 pages).
(Continued)

*Primary Examiner* — Wei Zhao
(74) *Attorney, Agent, or Firm* — Rothwell, Figg, Ernst & Manbeck, P.C.

(57) ABSTRACT

Embodiments herein relate to a method performed by a radio-network node (110) for handling Beam Reference Signals, BRS, of a beam transmitted by the radio-network node (110) in a wireless communications network. The radio-network node creates BRS blocks, wherein each BRS block comprises a respective group of adjacent subcarriers for the BRS belonging to a port of the beam, wherein the BRS belonging to the port is carried over each subcarrier in
(Continued)

Three radio network nodes or TPs, each with a number of beams
In each beam a unique BRS is transmitted the respective group of adjacent subcarriers of each BRS block. Furthermore, the radio-network node transmits the BRS blocks spread over a bandwidth in a same Orthogonal Frequency Division Multiplexing, OFDM, symbol.

26 Claims, 11 Drawing Sheets

(51) Int. Cl.
    *H04B 7/06*     (2006.01)
    *H04L 27/26*     (2006.01)

(52) U.S. Cl.
    CPC ........ *H04L 5/0023* (2013.01); *H04L 27/2605* (2013.01); *H04W 24/10* (2013.01); *H04L 5/0007* (2013.01)

(56) References Cited

U.S. PATENT DOCUMENTS

| | | |
|---|---|---|
| 2013/0182594 A1 | 7/2013 | Kim et al. |
| 2013/0337822 A1 | 12/2013 | Rubin et al. |
| 2015/0289281 A1 | 10/2015 | Kim et al. |
| 2016/0087706 A1 | 3/2016 | Guey et al. |
| 2017/0288831 A1* | 10/2017 | Cezanne ............ H04L 27/2613 |
| 2019/0007116 A1* | 1/2019 | Chang ................. H04B 7/0684 |
| 2019/0081688 A1* | 3/2019 | Deenoo ............... H04B 7/0695 |

FOREIGN PATENT DOCUMENTS

| | | |
|---|---|---|
| KR | 10-2011-0084594 A | 7/2011 |
| KR | 10-2015-510322 A | 4/2015 |
| WO | 2013/109041 A1 | 7/2013 |

OTHER PUBLICATIONS

3GPP TSG-RAN WG1 #86bis, R1-1609516; Lisbon, Portugal; Oct. 10-14, 2016; Intel Corporation, Beam management for initial and candidate beam discovery (BM P-1). (11 pages).

3GPP TSG RAN WG1 Meeting #82; R1-154367; Beijing, China, Aug. 24-28, 2015; ITRI, "Configurations of Beamformed CSI-RS". (4 pages).

Japanese Office Action dated Oct. 4, 2019 issued in Japanese Patent Application No. 2018-552000 (5 pages).

Qualcomm Incorporated, Enhancement on Beamformed CSI-RS for eFD-MIMO, 3GPP TSG-RAN WG1 #84bis, R1-163039, Apr. 11-15, 2016, Busan, Korea (4 pages).

Summary of the Notice of Preliminary Rejection dated Jan. 17, 2020 issued in Korean Patent Application No. 2018-7029219. (2 pages).

\* cited by examiner

METHODS AND SYSTEMS FOR PROVIDING
CHANNEL ESTIMATION

CROSS REFERENCE TO RELATED
APPLICATION(S)

This application is a 35 U.S.C. § 371 National Stage of International Patent Application No. PCT/SE2016/051179, filed Nov. 29, 2016, designating the United States and claiming priority to U.S. provisional application No. 62/322,835, filed on Apr. 15, 2016. The above identified applications are incorporated by reference.

TECHNICAL FIELD

Embodiments herein relate to a radio-network node, a wireless device and methods performed therein. In particular, embodiments herein relate to Beam Reference Signals in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas or cell areas, which may also be referred to as a beam or a beam group, with each service area or beam being served or controlled by a radio-network node such as a radio access node e.g., a Wi-Fi access point or a radio base station (RBS), which in some networks may also be denoted, for example, a "NodeB" or "eNodeB". The radio-network node communicates over an air interface operating on radio frequencies with the wireless device within range of the radio-network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio-network nodes may be connected, e.g., by landlines or microwave, to a controller node, such as a radio-network controller (RNC) or a base station controller (BSC), which supervises and coordinates various activities of the plural radio-network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio-network nodes are directly connected to the EPC core network rather than to RNCs. In general, in E-UTRAN/LTE the functions of an RNC are distributed between the radio-network nodes, e.g. eNodeBs in LTE, and the core network. As such, the RAN of an EPS has an essentially "flat" architecture comprising radio-network nodes connected directly to one or more core networks, i.e. they are not connected to RNCs. To compensate for that, the E-UTRAN specification defines a direct interface between the radio-network nodes, this interface being denoted the X2 interface.

Multi-antenna techniques can significantly increase the data rates and reliability of a wireless communications network. The performance is in particular improved if both the transmitter and the receiver are equipped with multiple antennas, which results in a Multiple-Input Multiple-Output (MIMO) communication channel. Such systems and/or related techniques are commonly referred to as MIMO.

Advanced Antenna Systems (AASs) is an area where technology has advanced significantly in recent years and where we also foresee a rapid technology development in the years to come. Hence it is natural to assume that AASs in general and massive MIMO transmission and reception in particular will be used in a future Fifth Generation (5G) system.

In relation to the AAS, beam-forming is becoming increasingly popular and capable and it is not only for transmission of data but also for transmission of control information.

In a system with beam-formed transmissions, in order for a transmitter to select the best beams to transmit in, it needs feedback from a receiver. Therefore, each beam typically comprises a unique Reference Signal (RS), also referred to as a Beam Reference Signal (BRS). The BRS provides a means for the receiving side to identify each beam and perform received power measurements on it, i.e., RS Received Power (RP)-measurements. Mobility Reference Signals (MRS) may also be used to perform received power measurements on.

BRS

In a future 5G system a radio-network node may transmit one or more multiple beams, and one or two reference signals (RS) per beam, here denoted as Beam Reference Signals, BRS. Note that two reference signals may be transmitted per beam, in the case of transmitting two polarizations per beam one reference signal is transmitted per polarization, and since the beam has two polarizations, the beam actually has two ports or antenna ports. Another alternative is that a beam only has a single port. Whether a beam has one or two ports is strictly a matter of definition and depends on whether or not a beam is defined to consist of one or two polarizations. From an implementation perspective, the normal case is that a beam consists of both polarizations, and thus, has two ports or antenna ports. However, from a conceptual point it is simpler to associate one beam with one port and this is done throughout this text.

One BRS is transmitted in one Orthogonal Frequency-Division Multiplexing (OFDM) symbol in one beam. The next OFDM symbol may thus be transmitted in a different beam to cover many beams.

One OFDM symbol may transmit multiple beams. As an example, one OFDM symbol may transmit 8 beams, on 8 ports, where a port is equivalent to a transmitted reference signal or beam. When a wireless device, as also referred to as a UE, measures a channel using a certain reference signal, it is said that it is measuring the channel from that transmission port. One may also say that a data layer is transmitted from a certain port; in that case, the receiver can demodulate the data layer using the reference signal associated with that port. A port or a BRS port may be defined by the BRS transmitted from the port and the port is associated with a transmitted beam. The channel estimate inferred from the BRS may be used as channel estimate for any data transmitted in the same beam.

The purpose with this is for the wireless device to discover beams, e.g. to be used for mobility and for the radio-network node to track beams that are useful from a data-transmission perspective, i.e. are received with sufficient Signal to Interference plus Noise Ratio (SINR), for the wireless device.

The wireless device searches for a set of BRSs to find candidate beams and performs measurements on these BRSs. For instance received power of the BRS is measured BRS-Received Power (RP). Searching for a set of BRSs, means that the wireless device measures the BRS-RP for multiple BRSs and tries to find the most useful BRS, i.e. the most useful transmit beam. Which of the BRSs to search for, i.e. which reference signals that may be transmitted in the given subframe and for which it is worthwhile to measure BRS-RP, may be configured in the wireless device, e.g. in active mode, or may be given by specifications. The wireless device knows where in the time-frequency grid a given BRS is transmitted and it also knows what it looks like. Hence, the "search" amounts to doing a correlation with the known signal, of all BRSs in the set, in their respective location in time/frequency, against the received signal and evaluating the resulting power. The term "search" is more indicative of the fact that the wireless device does not know which beams are actually pointing towards it so it has no preconceived notion of which beams will have strong RSRP, i.e., which beams that will be detected.

The wireless device then reports the result of the BRS measurement in a measurement report and possibly also any beam index or equivalently, the index of the BRS, of the measured BRSs to the radio-network node. The wireless device has to report a beam index in some way otherwise the BRS measurement cannot be linked to a specific beam at the radio-network node, and hence, does not provide any info about which beams would be good to transmit in. The wireless device may make a BRS selection first, for instance the K strongest BRS-RP is measured and/or selected and reported where K is given by specification, for example K=1, or K is configured by higher layer signaling, for instance by RRC signalling.

A typical case would be that all candidates are measured and a subset of the strongest ones is reported back to the radio-network node. If, for some reason, the radio-network node, such as the eNB, knows that the wireless device is in a position where it can only receive a subset of the Transmits (Tx)-beams, i.e. BRSs, then it may restrict the set of beams which the wireless device has to measure on. However, such a solution doesn't provide any advantage since all BRS/ beams have to be transmitted from the radio-network node anyway since other wireless devices may hear them. Hence, the only saving at the wireless device is less processing but it comes at the cost of the radio-network node having to know which beams can be heard by that wireless device.

FIG. 1 depicts a scenario in a wireless communications network, with three Transmission Points (TP), TP1, TP2, and TP3, such as radio-network nodes, each TP with a possibility to provide a number of beams. In each beam a unique BRS is transmitted.

Interference Suppression

Interference arising from BRSs transmitted from other transmission points, or radio-network nodes in the wireless communications network, may be suppressed according to the following example:

Assume that the received signal on subcarrier n can be described as $$y(n)=h1(n)*x1(n)+h2(n)*x2(n)+v(n), \text{ where}$$

y is received signal at the wireless device h1(n) is the channel for beam 1 on subcarrier n (the beam may be from other interfering radio-network node)

h2(n) is the channel for beam 2 on subcarrier n (the beam may be from other interfering radio-network node), x1(n) is the signal transmitted on subcarrier n in beam 1 (the signal may be from other interfering radio-network node)

x2(n) is the signal transmitted on subcarrier n in beam 2, (the signal may be from other interfering radio-network node)

v (n) is noise and interference n is subcarrier index of the signals or channels The wireless device is to measure beam 1, and thus correlates with x1(n) over N samples Z=Sum(x1(n)*y(n),n=1 ... N)

If the channel is flat, h1(n)=h1, h2(n)=h2 and if the sequences x1,x2 are orthogonal over the N samples, then Z=sum(|x1(n)|^2, n=1 ... , N)*h1, and correct beam power can be measured since the cross sequence terms vanish from the expression Z.

But, if the channel is frequency selective, and in the worst case if that fading channel h1(n) is a random sequence, then this results in, Z~0, and the beam power cannot be measured due to incoherent combining and interference.

This shows that the channel needs to be flat, or highly correlated, over the correlation interval, i.e. over the interval for which the signal x1 is transmitted, here described as the N samples, to be able to suppress interference from the other, interfering, signal, x2.

BRS transmissions from other radio-network nodes will collide with the BRS transmissions from the radio-network node transmitting the BRSs that the wireless device is measuring and it is a problem how to obtain protection against interference. Hence, BRS transmissions may in some scenarios be poorly measured and this results in a poor or inaccurate channel estimation leading to a reduced or limited performance of the wireless communications network.

SUMMARY

An object herein is to provide a mechanism that improves the performance of a wireless communications network when using beam-formed communications.

According to an aspect the object is achieved by providing a method performed by a radio-network node for handling BRSs of a beam transmitted by the radio-network node in a wireless communications network. The radio-network node creates BRS blocks, wherein each BRS block comprises a respective group of adjacent subcarriers for the BRS belonging to a port of the beam, wherein the BRS belonging to the port is carried over each subcarrier in the respective group of adjacent subcarriers of each BRS block. Furthermore, the radio-network node transmits the BRS blocks spread over a bandwidth in a same OFDM symbol.

According to another aspect the object is achieved by providing a method performed by a wireless device for measuring BRSs of a beam transmitted by a radio-network node in a wireless communications network. The wireless device receives BRS blocks spread over a bandwidth in a same OFDM symbol. Each BRS block comprises a respective group of adjacent subcarriers for the BRS belonging to a port of the beam, and wherein the BRS belonging to the port is carried over each subcarrier in the respective group of adjacent subcarriers of each BRS block. The wireless device further performs measurements on the BRS blocks.

According to yet another aspect the object is achieved by providing a radio-network node for handling BRSs of a beam transmitted by the radio-network node in a wireless communications network. The radio-network node is configured to create BRS blocks, wherein each BRS block comprises a respective group of adjacent subcarriers for the BRS belonging to a port of the beam, and wherein the BRS belonging to the port is carried over each subcarrier in the respective group of adjacent subcarriers of each BRS block. Furthermore, the radio-network node is configured to transmit the BRS blocks spread over a bandwidth in a same OFDM symbol.

According to still another aspect the object is achieved by providing a wireless device for measuring BRS of a beam transmitted by a radio-network node in a wireless communications network. The wireless device is configured to receive BRS blocks spread over a bandwidth in a same OFDM symbol, wherein each BRS block comprises a respective group of adjacent subcarriers for the BRS belonging to a port of the beam, wherein the BRS belonging to the port is carried over each subcarrier in the respective group of adjacent subcarriers of each BRS block. The wireless device is further configured to perform measurements on the BRS blocks.

The BRS is mapped the BRS blocks and especially to groups of the BRS blocks in such a way that it is robust against channel fading as it is spread over the bandwidth and at the same time allows for processing gain against interference since the BRS is transmitted in adjacent subcarriers for which the channel is highly correlated and hence processing gain over interference is achieved. Therefore the performance of a wireless communications network is improved since both frequency diversity and interference suppression is achievable simultaneously.

BRIEF DESCRIPTION OF THE DRAWINGS

Embodiments will now be described in more detail in relation to the enclosed drawings, in which.

DETAILED DESCRIPTION

Figure 1:
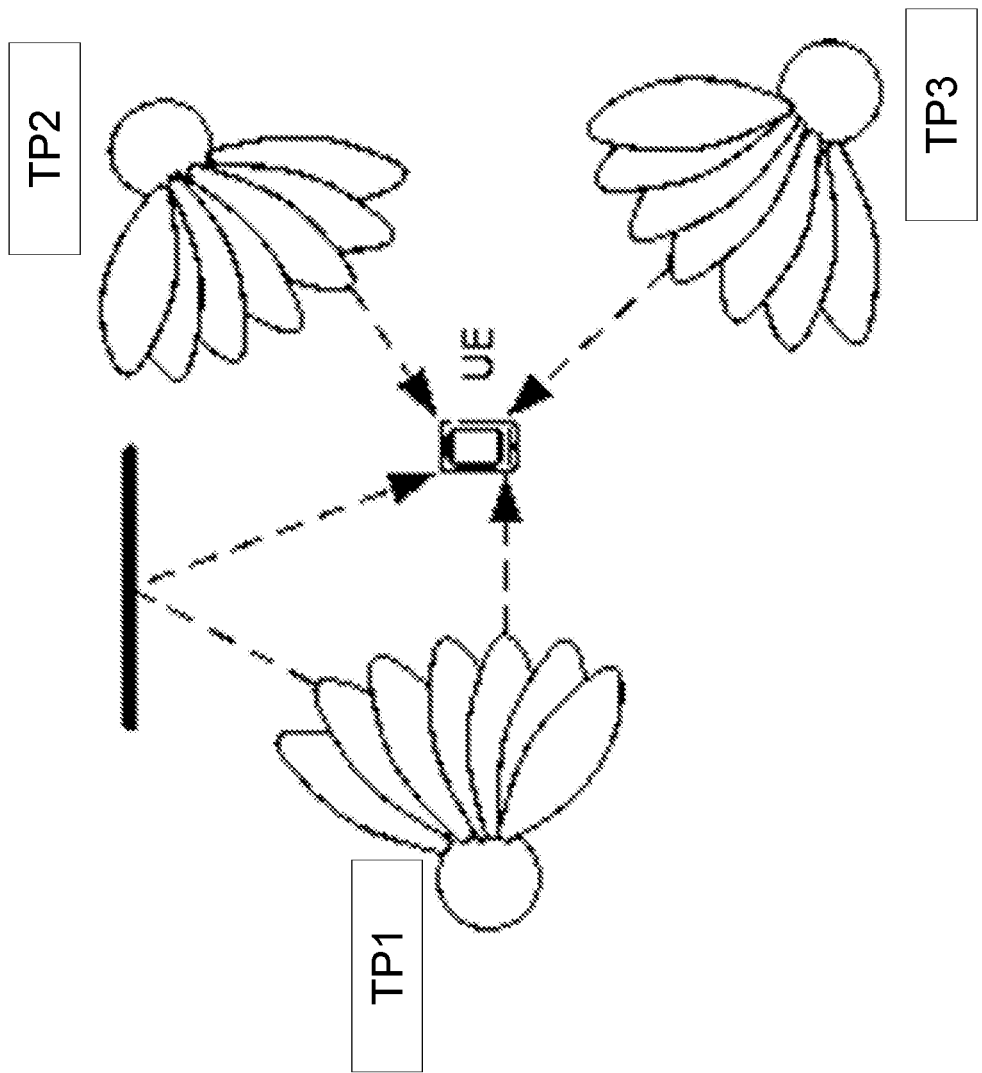
FIG. 1 is a schematic diagram depicting a scenario in a wireless communications network according to prior art.
Figure 2:
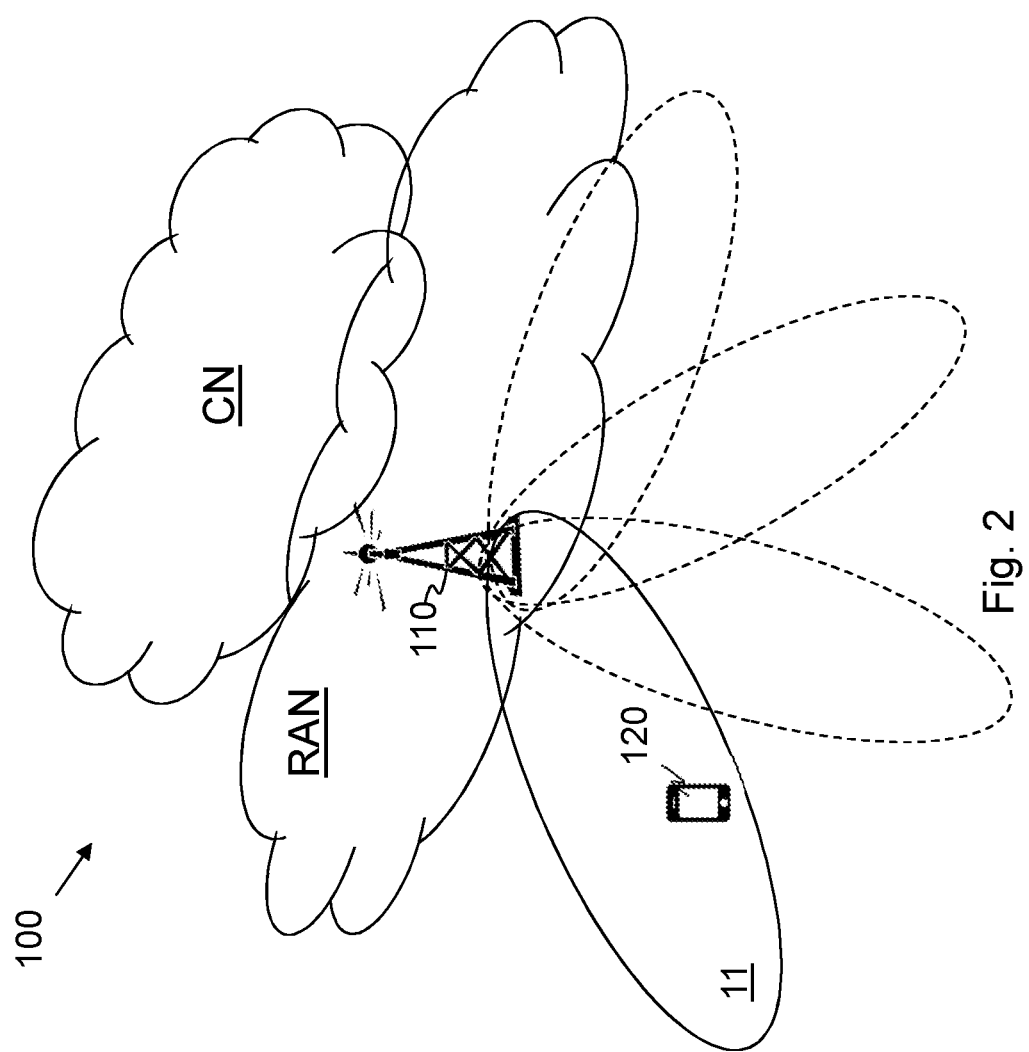
FIG. 2 is a schematic diagram depicting embodiments of a wireless communications network.

Embodiments herein relate to wireless communications networks in general. FIG. 2 is a schematic overview depicting a wireless communications network 100. The wireless communications network 100 comprises one or more RANs and one or more CNs. The wireless communications network 100 may use one or a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communications networks such as e.g. WCDMA and LTE.

In the wireless communications network 100, wireless devices e.g. a wireless device 120 such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises a radio-network node 110 providing radio coverage over a geographical area, a service area 11, which may also be referred to as a beam or a beam group where the group of beams is covering the service area of a first radio access technology (RAT), such as 5G, LTE, Wi-Fi or similar. The radio-network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio-network node 110 depending e.g. on the first radio access technology and terminology used. The radio-network node 110 may be referred to as a serving radio-network node and communicates with the wireless device 120 with Downlink (DL) transmissions to the wireless device 120 and Uplink (UL) transmissions from the wireless device 120.

The radio-network node 110 may transmit multiple beams, and one or two reference signals (RS) per beam e.g. BRS. An RS is associated with a port also referred to as an antenna port, i.e. when the wireless device 120 is performing a measurement using a particular RS, it can be equivalently said that the wireless device 120 is measuring the channel of the port that correspond to the particular RS. If the RS is beamformed, i.e. transmitted with a multi-antenna precoding vector that generates a beam in a certain pointing direction, one can say that the wireless device 120 is measuring a port of the beam. Since the radio-network node may transmit multiple beams, the wireless device 120 may measure on multiple ports of beams in sequence or in parallel. The wireless device 120 may perform channel estimation of one or more beams or ports based on received power or quality of the reference signals. According to embodiments herein the radio-network node 110 creates BRS blocks, wherein each BRS block comprises a respective group of adjacent subcarriers for the BRS belonging to a port of the beam. The BRS belonging to the port is carried over each subcarrier in the respective group of adjacent subcarriers of each BRS block. The radio-network node transmits the BRS blocks spread over a bandwidth in a same Orthogonal Frequency Division Multiplexing (OFDM) symbol. Thus, embodiments herein provide a higher correlation carrying the BRS over the group of adjacent subcarriers, and also a frequency diversity since it is spread out over the bandwidth and this thus enables a better channel estimation at the wireless device 120. That the BRS belongs to a port or a beam means that a precoder is the same for all the subcarriers carrying the BRS. Thus the BRS is transmitted through the same antenna port, where the antenna port corresponds to a certain beam/precoder.

Figure 3:
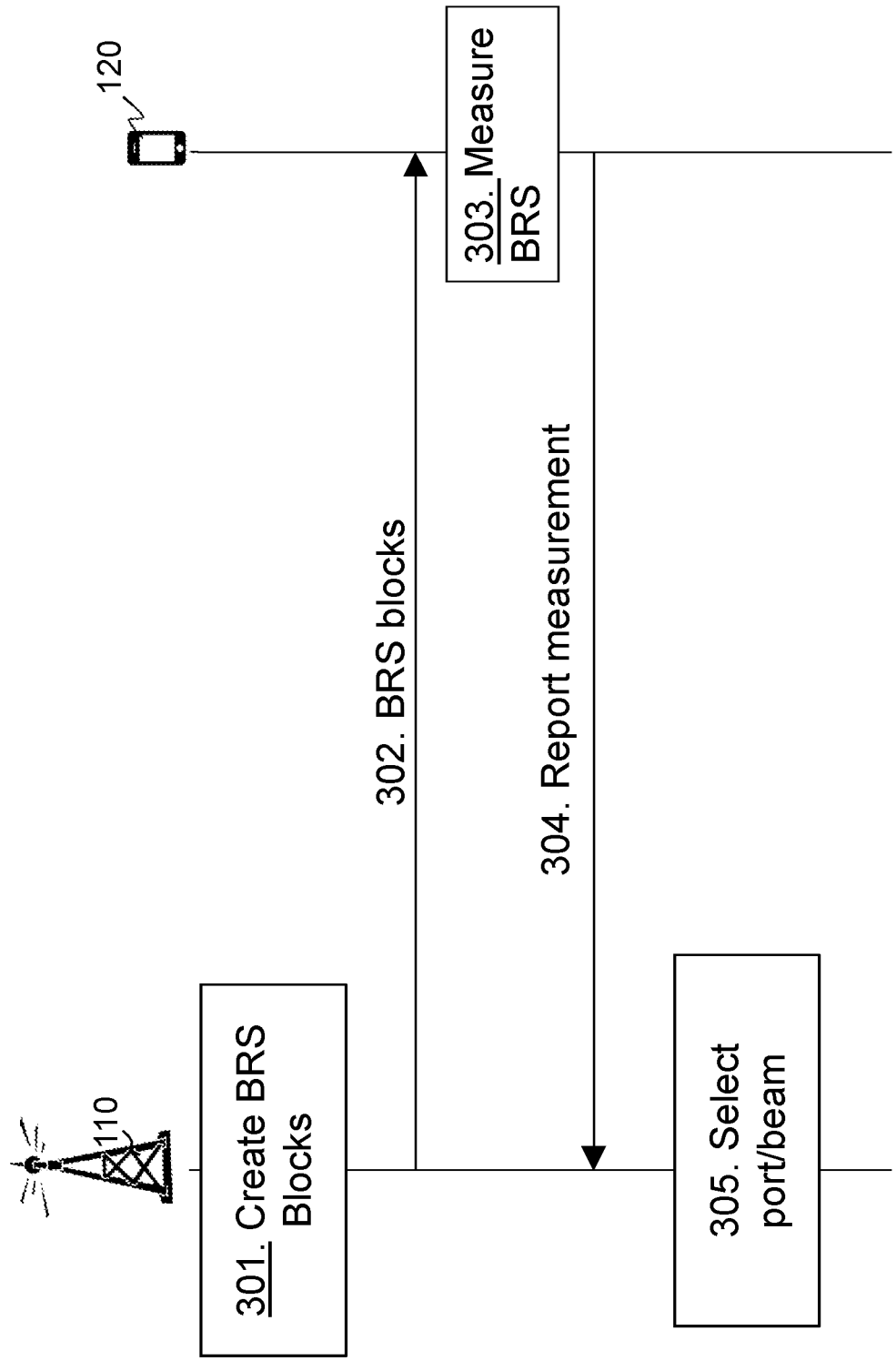
FIG. 3 is a combined flowchart and signalling scheme according to embodiments herein.

FIG. 3 is a sequence diagram depicting an example of reporting beam measurements.

Action 301. The radio-network node 110 creates BRS blocks, two or more. Each BRS block comprises the group of adjacent subcarriers for the BRS belonging to the port of the beam. The BRS belonging to the port is carried over each subcarrier in the group of adjacent subcarriers. Hence, a port represents a certain transmit precoder or beam. The group may also be referred to as a sub-block and thus the BRS block may comprise a number of sub-blocks, wherein each sub-block comprises the group or number of adjacent subcarriers carrying the corresponding BRS of the respective beam or port.

Action 302. The radio-network node 110 then transmits the created BRS blocks spread over a bandwidth, e.g. a system bandwidth, in the same OFDM symbol. The group of subcarriers for a particular port within one BRS block becomes spaced apart in relation to the same port in another BRS block. The BRS blocks may be allocated as adjacent blocks over the bandwidth. The bandwidth may be the full system bandwidth or a part of the system bandwidth.

Action 303. The wireless device 120 performs measurements on these BRS of the BRS blocks. For instance measures BRS-RP. The wireless device may measure the BRS-RP for multiple BRSs and try to find the most useful BRS, i.e. the most useful transmit beam. The wireless device performs a correlation with the known signal against the received signal and evaluates a resulting power.

Action 304. The wireless device 120 may then report, e.g. in a measurement report, the result of the measurements, and possibly also any beam index or equivalently, the index of the BRS, of the measured BRSs to the radio-network node 110. The wireless device 120 may make a BRS selection and report the selection, e.g. report the strongest or a number of BRSs above a threshold.

Action 305. The radio-network node 110 may then select port or beam for transmission of data or signaling to the wireless device 120 based on the received measurement report. E.g. the radio-network node 110 may select the port of the beam, action 301, if indicated to have a strong or a strongest received signal at the wireless device 120 and transmit data or e.g. control signaling to the wireless device 120 using the port of the beam.

Figure 4:
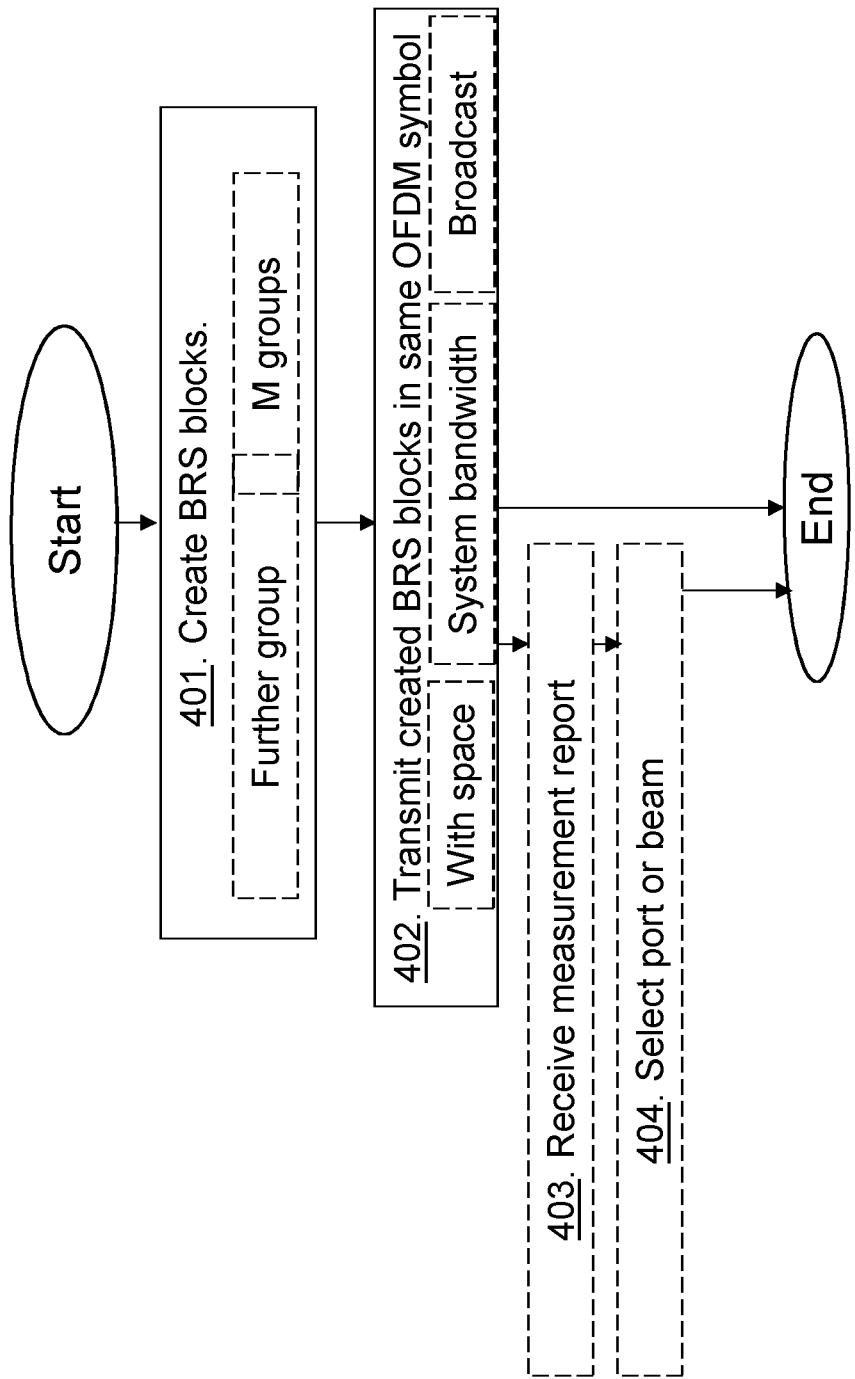
FIG. 4 is a flowchart depicting a method performed by a radio-network node according to embodiments herein.

FIG. 4 is a flowchart depicting a method performed by the radio-network node 110 for handling BRS of the beam transmitted by the radio-network node 110 in the wireless communications network.

Figure 8:
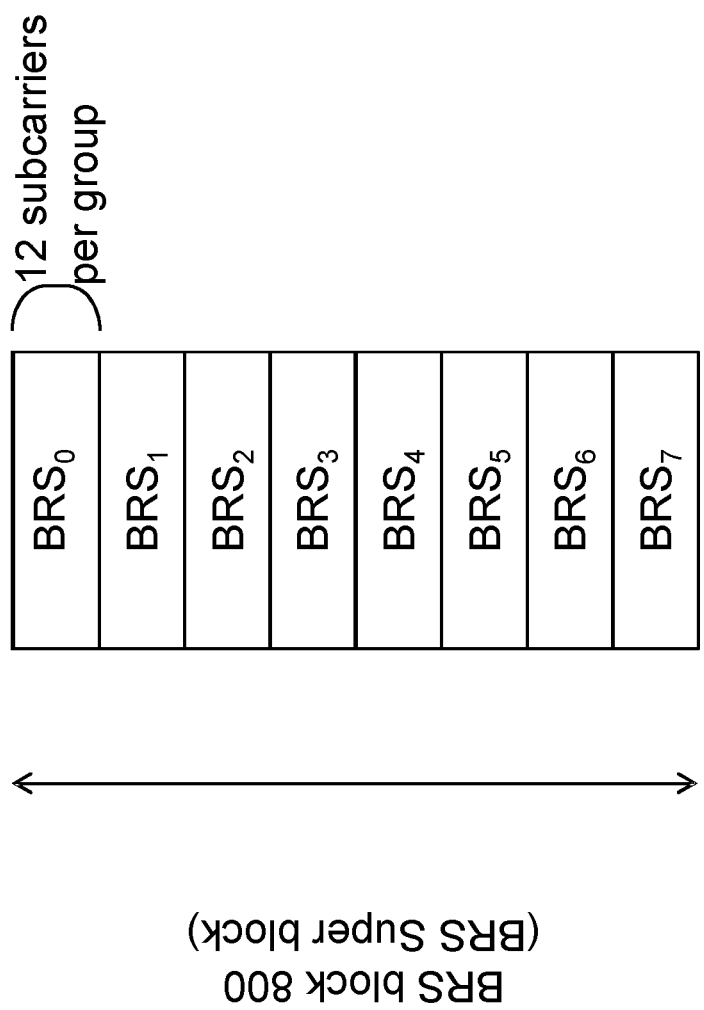
FIG. 8 is a schematic block diagram depicting a BRS block according to embodiments herein.

Action 401. The radio-network node 110 creates the BRS blocks, two or more BRS blocks. Each BRS block comprises a respective group of adjacent subcarriers for the BRS belonging to the port of the beam. The BRS belonging to the port is carried over each subcarrier in the respective group of adjacent subcarriers of each BRS block. Thus providing a higher correlation and leading to a better channel estimation. An example is shown in FIG. 8.

A further group of adjacent subcarriers in each BRS block may be allocated for a different BRS of a different beam. In some embodiments the radio-network node 110 comprises a multiple antenna system, which multiple antenna system supports a total number of beams or simultaneously transmitted beams. The radio-network node may then create the BRS blocks, wherein each BRS block comprises a number M of groups of adjacent subcarriers comprising the group and the further group mentioned above, wherein each group out of the number M of groups comprises a group of adjacent subcarriers carrying a corresponding BRS of a respective beam. The number M of groups corresponds to the total number of beams or simultaneously transmitted beams supported by the multiple antenna system.

Figure 9:
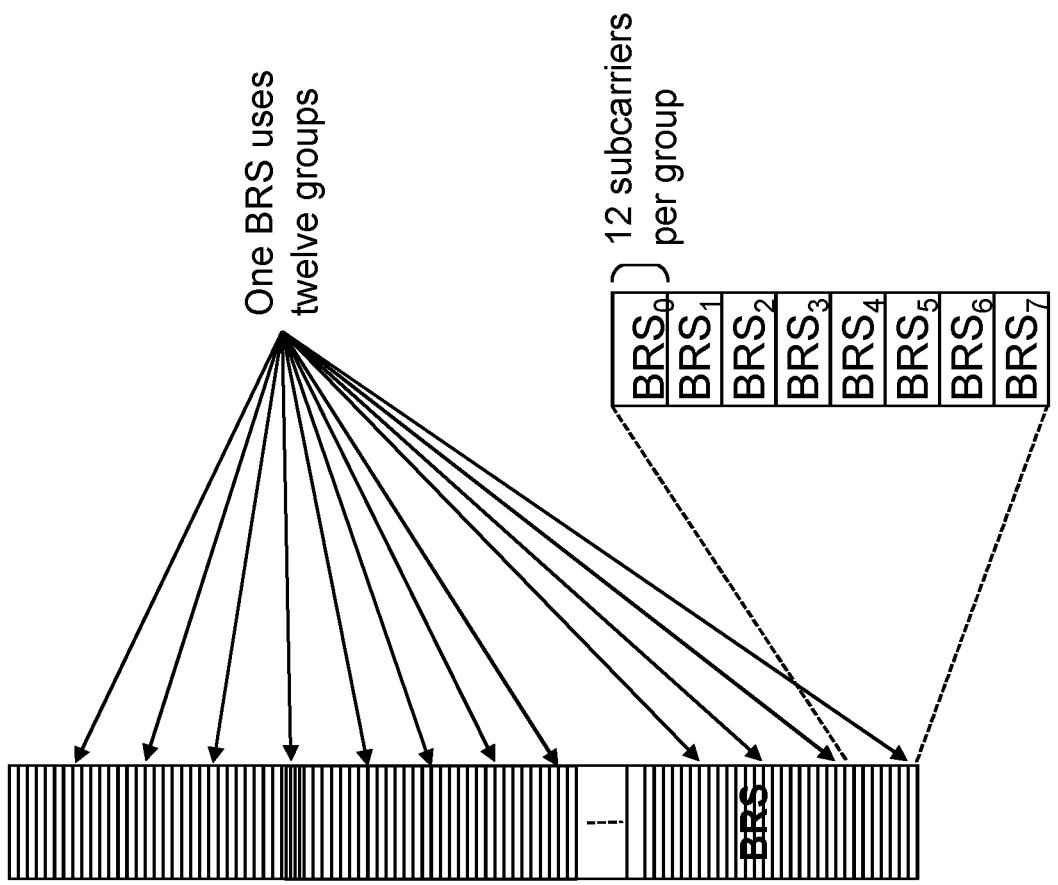
FIG. 9 is a schematic block diagram depicting BRS blocks according to embodiments herein.
Figure 10:
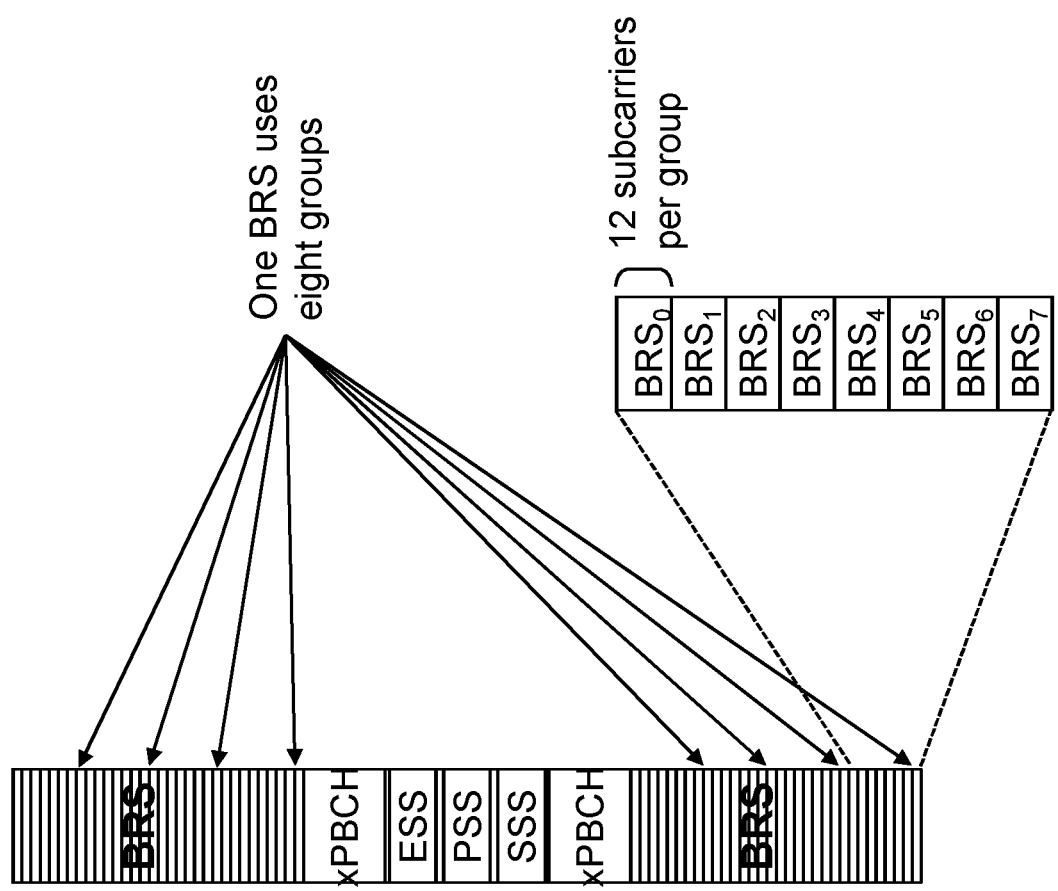
FIG. 10 is a schematic block diagram depicting BRS blocks according to embodiments herein.

Action 402. The radio-network node 110 transmits the BRS blocks spread over a bandwidth in the same OFDM symbol. Examples are shown in FIG. 9 and FIG. 10. E.g. the BRS blocks may be transmitted in the same OFDM symbol, and the groups of adjacent subcarriers carrying the BRS are spaced apart in the frequency domain. The BRS blocks may be transmitted repeatedly over the system bandwidth in the same OFDM symbol, see FIG. 9 below. The BRS blocks may be transmitted spaced apart in the frequency domain with a space in a middle of the bandwidth for other signals, such as Physical Broadcast Channel (xPBCH), Extended Synchronization Signals (ESS), Secondary Synchronization Signals (SSS) and Primary Synchronization Signals (PSS), see FIG. 10 below. The radio-network node 110 may broadcast the BRS blocks in the service area 11 or beam. Thus, the radio-network node transmits the BRS blocks in the same OFDM symbol, wherein the groups of adjacent subcarriers carrying the BRS are spaced apart in the frequency domain.

It should be noted that the port, or antenna port, may be obtained by using a multi-antenna precoder across the transmitter antennas at the radio-network node 110. The precoder may generate the transmitted beam. Stating that the subcarriers belongs to the port, means that a multi antenna precoder is the same for all these subcarriers. The BRS are transmitted through the same port, wherein the port corresponds to a certain beam/precoder. A port may be defined by the BRS transmitted from the port i.e. defined by the BRS transmitted from pre-defined set of symbols and subcarriers, and the port is thus associated with the transmitted beam.

Action 403. The radio-network node 110 may then receive a measurement report from the wireless device 120. The measurement report may indicate received strength or qualities for a number of port or beams. The different ports or beams may be indicated by BRS indices or identities in the measurement report.

Action 404. The radio-network node 110 may then select beam or port for transmitting data or signalling to the wireless device based on the received measurement report.

The BRS blocks may have different initialization seed values for a reference signal sequence of the respective BRS block. Thus, providing additional randomization of the interference, if each block (and each node) use different sequences.

According to some specific embodiments, BRS sequences are provided. Sequences with low or zero cross correlation is selected to ensure interference suppression.

A first example relates to LTE SSS sequences which have low cross correlation, see e.g. 3GPP TS 36.211, version 12.5.0 and section 6.11.2.1 for a description of the LTE SSS.

A second example relates to Zadoff-Chu sequences such as an LTE PSS sequence, see e.g. 3GPP TS 36.211, version 12.5.0 for a description of the LTE PSS sequences.

In some embodiments, the initialization seed value or sequence seed is obtained by the receiver from the detected PSS+SSS (Cell ID). That is, when the wireless device 120 has searched, i.e. correlated with, all possible PSS and SSS sequences, it has detected a PSS sequence index and a SSS sequence index. These two indices jointly determine or define a Cell ID number, which is a number between 0 and 503.

As stated above, different BRS blocks have different initialization seed value for the sequences, e.g. dependent on the detected cell ID+BRS block ID. The benefit of this is additional randomization of interference. The initialization seed values for the PSS and SSS sequences are scalar numbers that uniquely determines the PSS and SSS sequences. Since a single scalar number can determine a whole sequence, it is denoted a seed, sequence seed, or initialization seed value for that sequence.

Figure 5:
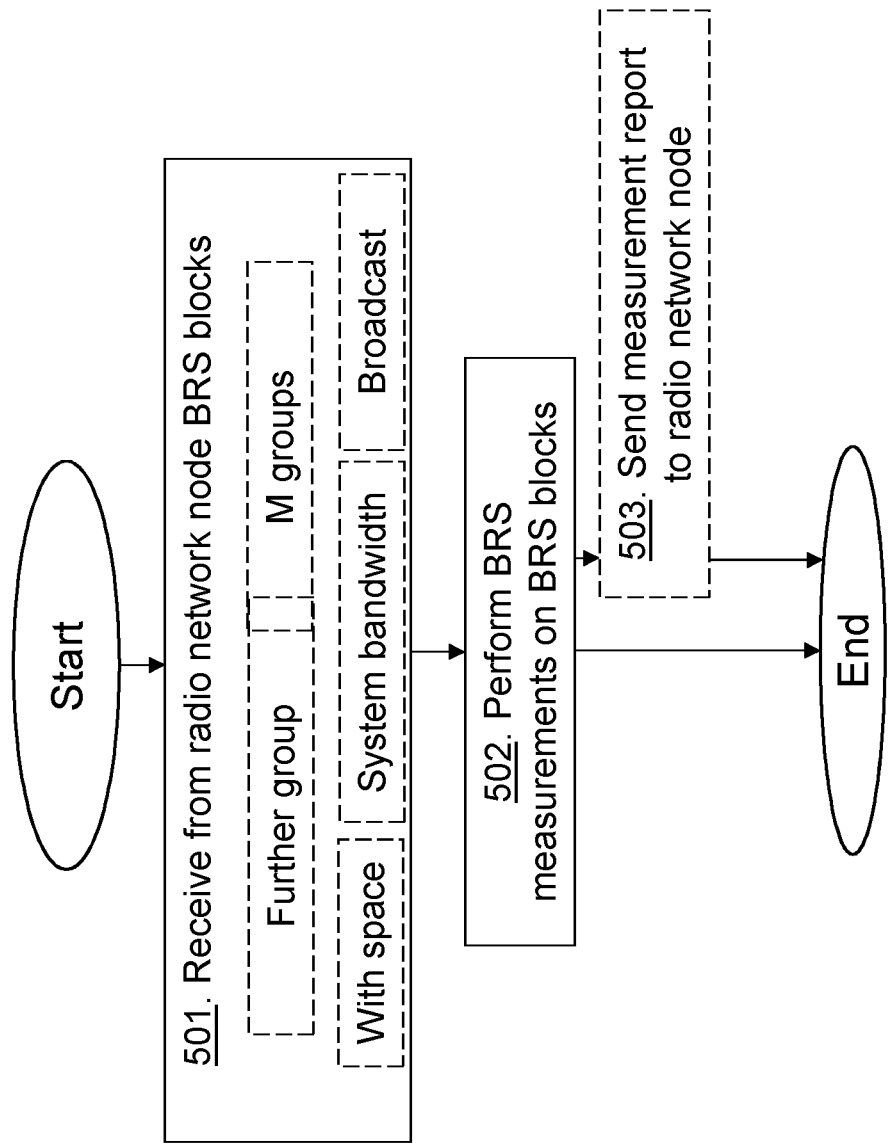
FIG. 5 is a flowchart depicting a method performed by a wireless device according to embodiments herein.

FIG. 5 is a flowchart depicting a method performed by the wireless device 120 for measuring BRS of the beam transmitted by the radio-network node 110 in the wireless communications network 100.

Action 501. The wireless device receives BRS blocks, two or more, spread over the bandwidth in the same OFDM symbol. Each BRS block comprises the respective group of adjacent subcarriers for the BRS belonging to the port of the beam, wherein the BRS belonging to the port is carried over each subcarrier in the respective group of adjacent subcarriers of each BRS block. For example, the wireless device 120 may receive the BRS blocks repeatedly transmitted over a system bandwidth in the same OFDM symbol. The wireless device 120 may receive the BRS blocks spaced apart in the frequency domain with the space in the middle of the bandwidth for other signals. The BRS blocks may have different initialization seed values for the reference signal sequence of the respective BRS block. In some embodiments each received BRS block comprises the further group of adjacent subcarriers allocated for the different BRS of the different beam. Each received BRS block may comprise the number M of groups of adjacent subcarriers, wherein each group out of the number M of groups comprises the group of adjacent subcarriers carrying the corresponding BRS of the respective beam e.g. the further group. The number M of groups corresponds to the total number of beams or simultaneously transmitted beams supported by the multiple antenna system comprising the group and the further group mentioned herein, which multi antenna system is comprised in the radio-network node 110.

Action 502. The wireless device 120 further performs measurements on the BRS blocks. The wireless device 120 may calculate the BRS-RS, which is e.g. shown in FIG. 11.

Action 503. The wireless device 120 may then report, e.g. in a measurement report, the result of the measurements, and possibly also any beam index or equivalently, the index of the BRS, of the measured BRSs to the radio-network node 110.

In this way a beam or port is mapped in such a way that it is robust against channel fading, e.g. spread over wide bandwidth. This is since the BRS associated with that beam or port is not localized to a subband of e.g. the total bandwidth, but rather spread out over the total bandwidth, and at the same time allows for processing gain against interference, e.g. localized in adjacent subcarriers, since the BRS is transmitted in adjacent subcarriers for which the channel is highly correlated and hence processing gain over interference is achieved Therefore the performance of a wireless communications network e.g. using multiple antenna systems is improved since both frequency diversity and interference suppression is achievable simultaneously. This ensures that a beam or port can be selected by the wireless device 120 with a higher probability of achieving a higher throughput or higher performance than if only localized or only distributed BRS was used. In other words, a more correct beam or port is selected which improves signal to noise ratio for the resulting link and this higher spectral efficiency can be obtained.

Figure 6:
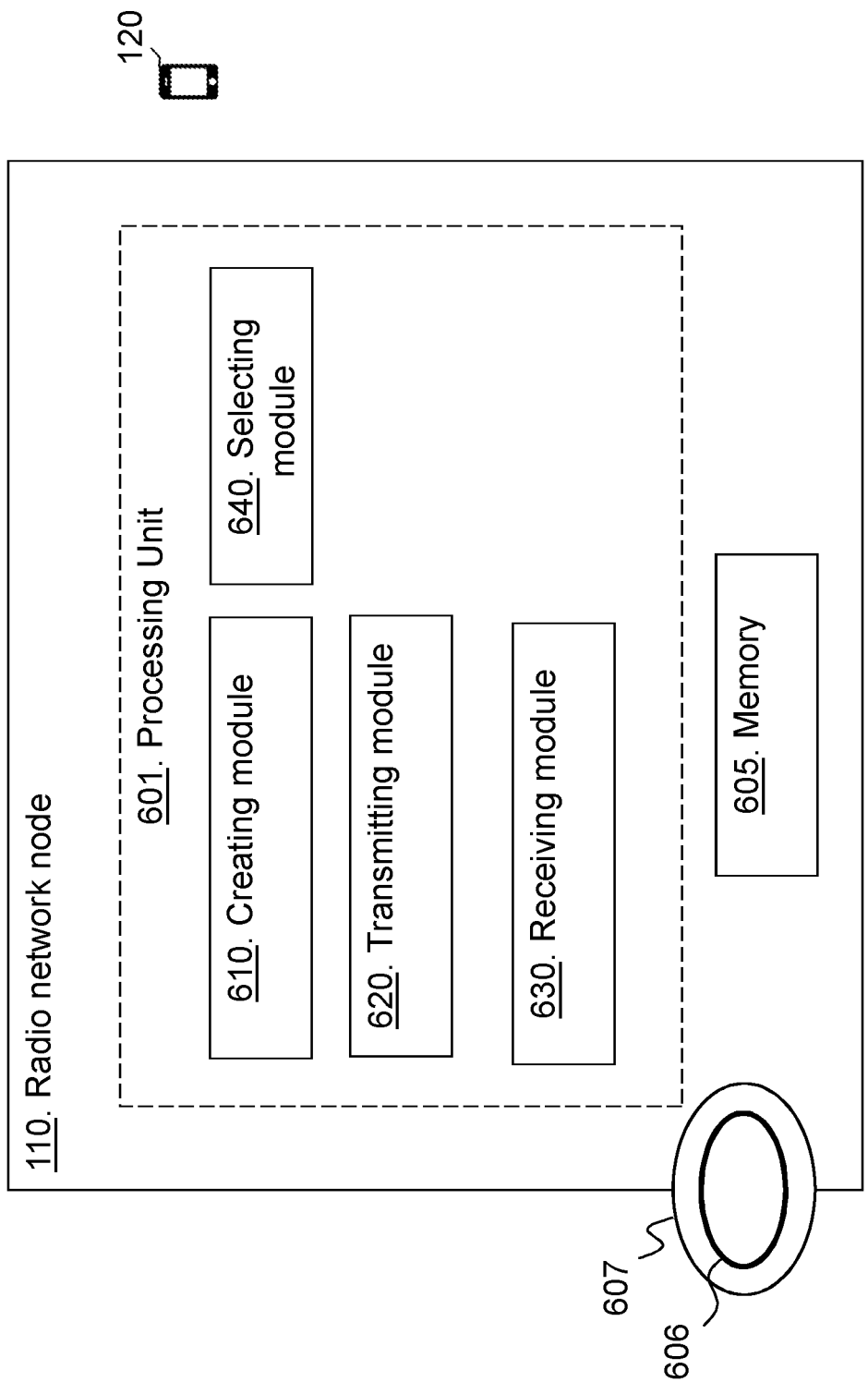
FIG. 6 is a schematic block diagram depicting a radio-network node according to embodiments herein.

FIG. 6 is a schematic block diagram depicting the radio-network node 110 for handling Beam Reference Signals, BRS, of the beam transmitted by the radio-network node 110 in the wireless communications network.

The radio network node 110 may comprise a processing unit 601, e.g. one or more processors, configured to perform the methods herein.

The radio-network node 110 may comprise a creating module 610. The radio-network node 110, the processing unit 601, and/or the creating module 610 is configured to create the BRS blocks, wherein each BRS block comprises the respective group of adjacent subcarriers for the BRS belonging to the port of the beam. The BRS belonging to the port is carried over each subcarrier in the respective group of adjacent subcarriers of each BRS block. The BRS blocks may have different initialization seed values for the reference signal sequence of the respective BRS block. The radio-network node 110, the processing unit 601, and/or the creating module 610 may be configured to allocate the further group of adjacent subcarriers in each BRS block for the different BRS of the different beam. The radio-network node 110 may a multiple antenna system, which multiple antenna system supports the total number of beams. The radio-network node 110, the processing unit 601, and/or the creating module 610 may be configured to create the BRS blocks, wherein each BRS block comprises the number M of groups of adjacent subcarriers. Each group out of the number M of groups comprises a group of adjacent subcarriers carrying the corresponding BRS of the respective beam, and wherein the number M of groups corresponds to the total number of beams supported by the multiple antenna system.

The radio-network node 110 may comprise a transmitting module 620 or broadcasting module. The radio-network node 110, the processing unit 601, and/or the transmitting module 620 is configured to transmit the BRS blocks spread over the bandwidth in the same OFDM symbol. The radio-network node 110, the processing unit 601, and/or the transmitting module 620 may be configured to repeatedly transmit the BRS blocks over the system bandwidth in the same OFDM symbol. The radio-network node 110, the processing unit 601, and/or the transmitting module 620 may be configured to transmit the BRS blocks spaced apart in the frequency domain with a space in the middle of the bandwidth for other signals, such as xPBCH, ESS, SSS and PSS. The radio-network node 110, the processing unit 601, and/or the transmitting module 620 may be configured to broadcast the BRS blocks.

The radio-network node 110 may further be configured to, e.g. by means of a receiving module 630 or the processing unit 601 configured to:

receive the measurement report from the wireless device 120, which measurement report comprises measurements performed by the wireless device 120 on the transmitted BRS blocks.

The radio-network node 110 may further be configured to, e.g. by means of a selecting module 640 configured to:

select based on the measurement report, one or more beams for the data transmission between the radio-network node 110 and the wireless device 120.

The radio-network node 110 may further comprise a memory 605 comprising one or more memory units. The memory 605 comprises instructions executable by the processing unit 601.

The memory 605 is arranged to be used to store e.g. information, data such as BRSs, BRS Blocks, allocation information, configurations, etc. to perform the methods herein when being executed in the radio-network node 110.

In some embodiments, a computer program 606 comprises instructions, which when executed by the at least one processor such as the processing unit 601, cause the at least one processing unit 601 to perform actions according to any of the Actions 401-404.

In some embodiments, a carrier 607 comprises the computer program 606, wherein the carrier 607 is one of an electronic signal, an optical signal, an electromagnetic signal, a magnetic signal, an electric signal, a radio signal, a microwave signal, or a computer-readable storage medium.

Figure 7:
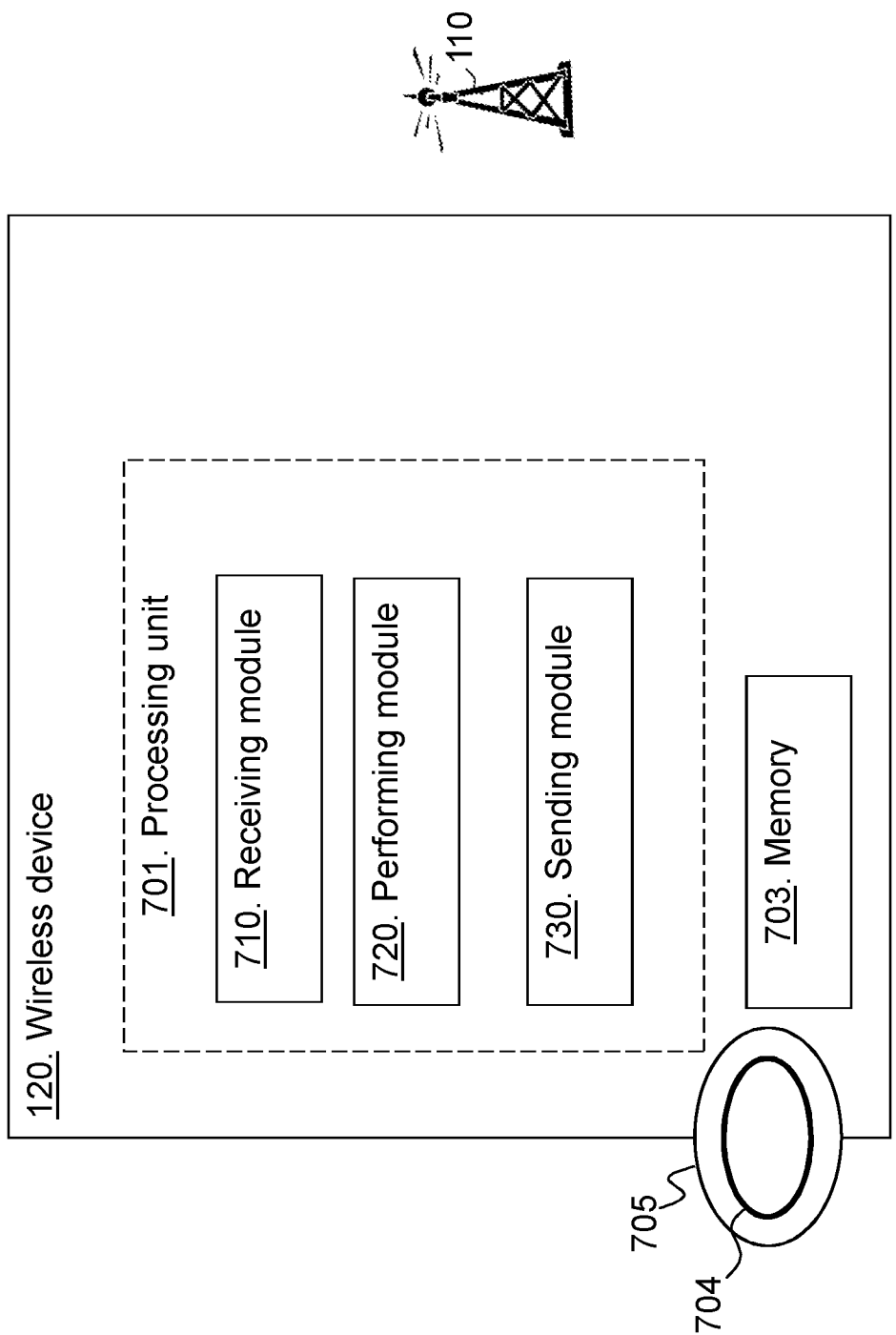
FIG. 7 is a schematic block diagram depicting a wireless device according to embodiments herein.

FIG. 7 is a schematic block diagram depicting the wireless device 120 for measuring BRSs of the beam transmitted by the radio-network node 110 in the wireless communications network.

The wireless device 120 may comprise a processing unit 701, e.g. one or more processors, configured to perform the methods herein.

The wireless device 120 may comprise a receiving module 710. The wireless device 120, the processing unit 701, and/or the receiving module 710 is configured to receive the BRS blocks spread over the bandwidth in the same OFDM symbol. Each BRS block comprises the respective group of adjacent subcarriers for the BRS belonging to the port of the beam. The BRS belonging to the port is carried over each subcarrier in the respective group of adjacent subcarriers of each BRS block. The wireless device 120, the processing unit 701, and/or the receiving module 710 may be configured to receive the BRS blocks repeatedly transmitted over a system bandwidth in the same OFDM symbol. The wireless device 120, the processing unit 701, and/or the receiving module 710 may be configured to receive the BRS blocks spaced apart in the frequency domain with a space in the middle of the bandwidth for other signals. The BRS blocks may have different initialization seed values for the reference signal sequence of the respective BRS block. Each received BRS block may comprise the further group of adjacent subcarriers allocated for the different BRS of the different beam. The wireless device 120, the processing unit 701, and/or the receiving module 710 may be configured to receive the BRS blocks, wherein each received BRS block comprises the number M of groups of adjacent subcarriers, and wherein each group out of the number M of groups comprises the group of adjacent subcarriers carrying the corresponding BRS of the respective beam. The number M of groups corresponds to the total number of beams supported by the multiple antenna system, which multi antenna system may be comprised in the radio-network node 110.

Figure 11:
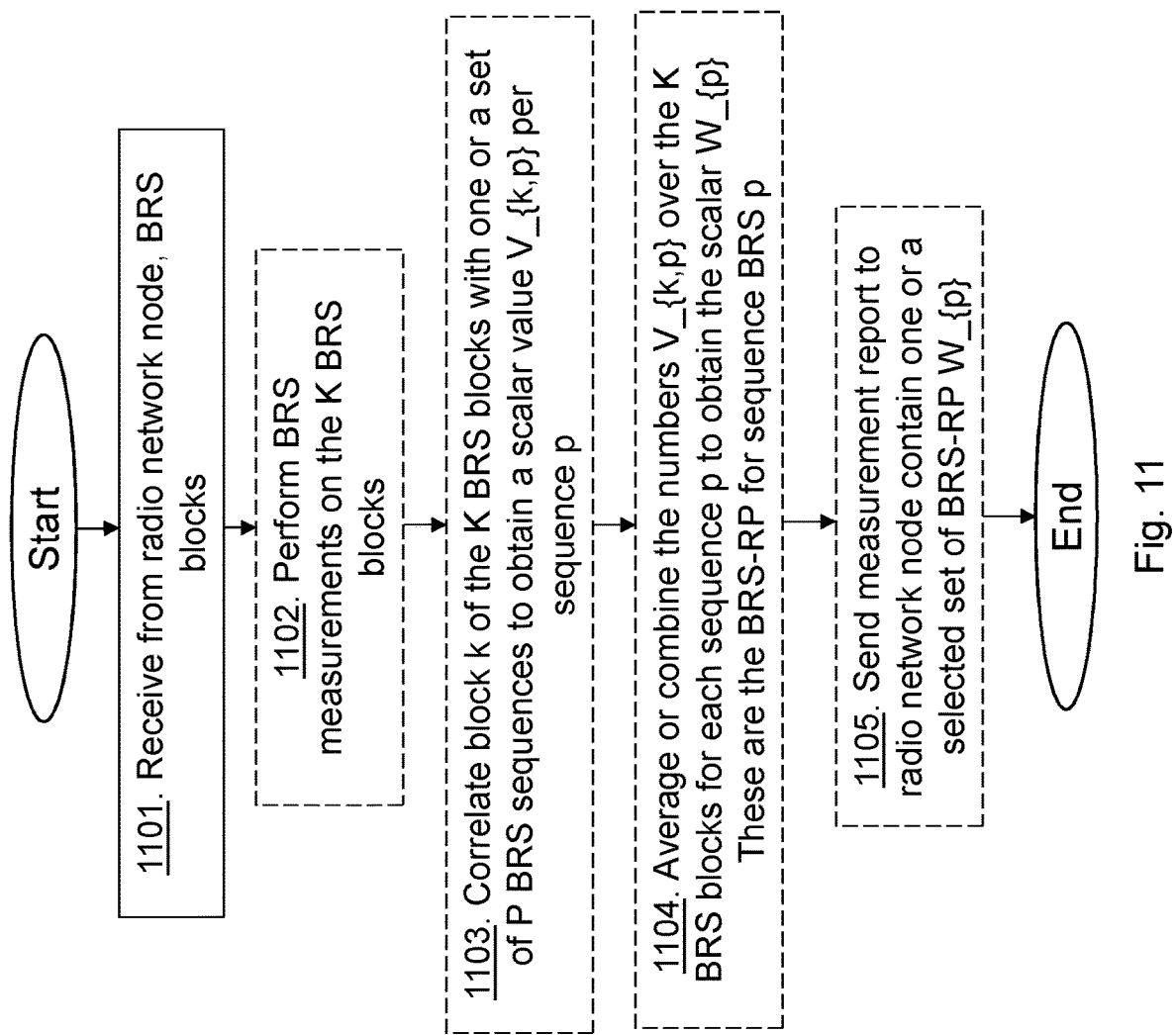
FIG. 11 is a flowchart depicting embodiments of a method performed by a wireless device.

The wireless device 120 may comprise a performing module 720. The wireless device 120, the processing unit 701, and/or the performing module 720 is configured to perform measurements on the BRS blocks. The wireless device 120, the processing unit 701, and/or the performing module 720 may then be configured to calculate the BRS-RS. An example is shown in FIG. 11.

In some embodiments, the wireless device 120 is further configured to, e.g. by means of a sending module 730 configured to:

send the measurement report to the radio-network node 110, which measurement report comprises the measurements performed by the wireless device 120 on the broadcasted one or more BRS blocks. This enables the radio-network node 110 to select based on the measurement report, one or more beams for a data transmission between the radio-network node 110 and the wireless device 120.

The wireless device 120 may further comprise a memory 703 comprising one or more memory units. The memory 703 comprises instructions executable by the processing unit 701.

The memory 703 is arranged to be used to store e.g. information, data such as BRSs, signal strengths, BRS block configurations, configurations, etc. to perform the methods herein when being executed in the wireless device 120.

In some embodiments, a computer program 704 comprises instructions, which when executed by the at least one processor such as the processing unit 701, cause the at least one processing unit 701 to perform actions according to any of the Actions 501-503.

In some embodiments, a carrier 705 comprises the computer program 704, wherein the carrier is one of an electronic signal, an optical signal, an electromagnetic signal, a magnetic signal, an electric signal, a radio signal, a microwave signal, or a computer-readable storage medium.

Embodiments herein relate to Block interleaved BRS where a BRS block comprises multiple sub-blocks or groups of adjacent subcarriers and where the sub-blocks or groups belonging to different ports are interlaced. Furthermore, frequency interleaving in LTE may distribute a signal, such as a data signal or reference signal over multiple subcarriers. If a single subcarrier fades, it is possible to achieve robustness since some other subcarriers used by the same BRS are not faded. The port is obtained by using a multi-antenna precoder across the transmitter antennas at the radio-network node 110 and wherein the multi-antenna precoder generates the transmitted beam. Since the port achieves both frequency diversity since the BRS of the port is spread out over the bandwidth in different BRS blocks e.g. the total bandwidth and at the same time has a structure that allows for despreading/correlation, mapping to adjacent subcarriers in the group, it has both benefits and can achieve both good Signal to Noise Ratio (SNR), due to diversity, and Signal-to-Interference-plus-Noise Ratio (SINR), due to interference suppression capability in the receiver, simultaneously.

According to embodiments herein, subcarriers comprising BRS belonging to one port of the beam are grouped into groups, see example in FIG. 8 showing a group comprising 12 subcarriers carrying one BRS.

The set of M such groups, i.e. a number of such groups, are adjacent and concatenated into the BRS block 800 also referred to as a BRS super block in the figure. The example shows 8 groups, i.e. M equals 8, in the BRS block.

The value M may be configured, signaled by system broadcast, or taken from a specification as the maximum number of supported BRS beams. In some embodiments, the group referred to above may also be referred to as a BRS group.

The BRS blocks may in some embodiments be repeatedly transmitted across the system bandwidth of the wireless communications network 100.

Now, see the schematic block diagram example in FIG. 9.

In FIG. 9, 12 BRS blocks carrying BRSs are shown. Each BRS block supports 8 beams, M equals 8 beams, which also may be referred to as ports, i.e. 12×8 equal 96 groups each with 12 subcarriers are shown. That is, in FIG. 9 one BRS uses twelve groups, and 12 subcarriers per group. As shown one BRS is mapped to e.g. 12 groups. This gives the benefit that the beam has frequency diversity since it is spread over multiple BRS blocks and each BRS block may fade independently since they are spaced apart in the frequency domain.

In some embodiments, one BRS is locally mapped to e.g. 12 subcarriers. A 12-subcarrier channel is rather frequency flat since the coherence bandwidth of a typical channel is larger than 12 subcarriers. The benefit with this is that it allows for interference suppression in the receiver since there is a processing gain when the wireless device 120 is correlating with the length of 12 sequence, provided that the channel is flat or rather flat over the 12 adjacent subcarriers in the BRS block.

According to some specific embodiments, BRS with band gap is provided, see the schematic block diagram example in FIG. 10.

In FIG. 10, 8 BRS blocks carrying BRSs are shown. Each BRS block is supporting 8 beams, M equals 8 beams, i.e. 8×8 equal 64 groups each with 12 subcarriers are shown. That is, one BRS uses eight groups, and 12 subcarriers per group. A group may also be referred to as a group of subcarriers or BRS group herein. In these embodiments, a space is left in the middle of the bandwidth for other signals such as e.g. Physical Broadcast Channel (xPBCH), Extended Synchronization Signals (ESS), Secondary Synchronization Signal (SSS) and Primary synchronization signal (PSS). In this way, the BRS may be transmitted in the same OFDM symbol as the other signals, which improves latency compared to transmitting them in two different OFDM symbols. The x in xPBCH is used to distinguish it from 4G. So PBCH is 4G and xPBCH is e.g. for 5G. These two PBCH may have different structure and content. Please note that x may be replaced by any other letter as no particular meaning is given to the letter x above.

The BRS blocks may be broadcasted spread over the bandwidth and in one Orthogonal Frequency-Division Multiplexing symbol.

FIG. 11 is a flowchart depicting an example of implementation embodiments of a method performed by the wireless device 120 being the receiver of the broadcasted BRS with the BRS blocks, showing how the wireless device 120 computes the BRS-RS.

In these embodiments, the wireless device 120 correlates the signal received in each BRS block independently for each BRS block to obtain a scalar number per BRS block. This then has low interference since it has processing gain. This gives multiple, different scalar numbers, one per BRS block that port is using. Assume a port use K BRS blocks. Then the receiver combines these K scalar numbers, for instance by averaging these K numbers. A single scalar is then obtained which contains both the interference suppressed part and the frequency averaged part. This is then the resulting BRS-RP for that port. This is depicted in FIG. 11 wherein the method comprises one or more out of the following actions:

Action 1101. The wireless device 120 receives BRS blocks from radio-network node 110. This relates to Action 501 above.

Action 1102. The wireless device 120 performs BRS measurements on the K BRS blocks. This relates to Action 502 above.

Action 1103. The wireless device 120 correlates block k of the K BRS blocks with one or a set of P BRS sequences to obtain a scalar value $V\_\{k,p\}$ per sequence p. This relates to Action 502 above.

Action 1104. The wireless device 120 averages or combines the numbers $V\_\{k,p\}$ over the K BRS blocks for each sequence p to obtain the scalar $W\_\{p\}$. These are the BRS-RP for sequence BRS p. This relates to Action 502 above.

Action 1105. The wireless device 120 sends the measurement report to the radio-network node 110 comprising one or a selected set of BRS-RP $W\_\{p\}$. This relates to Action 503 above.

It is herein disclosed an example of a method performed by the radio-network node 110, for broadcasting or handling Beam Reference Signals in the wireless communications network 100.

The radio-network node 110 comprises may comprise a multiple antenna system, which multiple antenna system supports a number of beams. The method comprises:

Creating the BRS blocks,
  wherein each BRS block comprises a number M of adjacent groups of subcarriers,
  each group out of the number M of groups comprises a group of subcarriers, where each subcarrier in the group of subcarriers comprises a BRS belonging to one beam.
  The number M of groups may for example correspond to the total number of beams supported by the multiple antenna system from that transmission point or radio network node 110.
transmitting the BRS blocks.

In some embodiments, the transmitting of the BRS blocks is repeated across the system bandwidth of the wireless communications network 100.

The method may further comprise any one of:
Receiving a measurement report from the wireless device 120, which measurement report comprises measurements performed by the wireless device 120 on the broadcasted BRS blocks,
Selecting based on the measurement report, one or more beams for a data transmission between the radio-network node 110 and the wireless device 120.

It is further disclosed herein an example of a method performed by the wireless device 120, for receiving, in the wireless communications network 100, transmitted BRS or BRSs from e.g. the radio-network node 110 comprising e.g. the multiple antenna system. The multiple antenna system supports a plurality or number of beams. The exemplary method comprises:

receiving the BRS blocks e.g. broadcasted by the radio-network node 110,
  wherein each BRS block comprises the number M of adjacent groups of subcarriers,
  each group out of the number M of groups comprises a group of subcarriers, each subcarrier in the group of subcarriers comprises a BRS belonging to one beam.

The number M of groups may for example correspond to the number of beams supported by the multiple antenna system.

In some embodiments, the received broadcasting of the BRS blocks is repeated across the system bandwidth of the wireless communications network 100.

The method may further comprise any one of:

performing measurements on the received broadcasted BRS blocks, and in some embodiments, compute the BRS-RP;

sending the measurement report to the radio-network node 110, which measurement report comprises the measurements performed by the wireless device 120 on the transmitted BRS blocks. This enables the radio-network node 110 to select based on the measurement report, one or more beams for a data transmission between the radio-network node 110 and the wireless device 120.

In addition it is herein disclosed the radio-network node 110, e.g. for broadcasting BRSs in the wireless communications network 100. The radio network node is shown in FIG. 6. The radio-network node 110 is adapted to comprise e.g. the multiple antenna system, which multiple antenna system is capable of supporting a number of beams.

The radio-network node 110 may be configured to, e.g. by means of the creating module 610:

create the BRS blocks,
  wherein each BRS block comprises the number M of adjacent groups of subcarriers,
  each group out of the number M of groups comprises the group of subcarriers, wherein each subcarrier in the group of subcarriers comprises the BRS belonging to the one beam.

The number M of groups may for example correspond to the number of beams supported by the multiple antenna system.

The radio-network node 110 may further be configured to, e.g. by means of the transmitting module 620 configured to:
transmit or broadcast the BRS blocks.

The radio-network node 110 may further be configured to, e.g. by means of the transmitting module 620 configured to:
repeat the broadcasting of the BRS blocks across the system bandwidth of the wireless communications network 100.

The embodiments herein may be implemented through one or more processors, such as the processing unit 601 in the radio-network node 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the radio-network node 110. One such carrier may be in the form of a CD ROM disc. It is however feasible with other data carriers such as a memory stick. The computer program code may furthermore be provided as pure program code on a server and downloaded to the radio-network node 110.

Additionally, it is herein disclosed the wireless device 120 for receiving in the wireless communications network 100, transmitted or broadcasted BRSs from the radio-network node 110 e.g. comprising the multiple antenna system. See FIG. 7. The multiple antenna system is capable to support a number of beams.

The wireless device 120 is configured to, e.g. by means of the receiving module 710 configured to:
receive the BRS blocks transmitted or broadcasted by the radio-network node 110,
  wherein each BRS block comprises the number M of adjacent groups of subcarriers,
  each group out of the number M of groups comprises the group of subcarriers, each subcarrier in the group of subcarriers comprises the BRS belonging to one beam.

The number M of groups may for example correspond to the number of beams supported by the multiple antenna system.

In some embodiments, the transmitting of the BRS blocks is repeated across the system bandwidth of the wireless communications network 100.

In some embodiments, the wireless device 120 is further configured to, e.g. by means of the performing module 720 configured to:
perform measurements on the received broadcasted BRS blocks.

The embodiments herein may be implemented through one or more processors, such as the processing unit 701 in the wireless device 120 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio-network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio-network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio-network node for handling Beam Reference Signals (BRS) of a beam transmitted by the radio-network node in a wireless communications network, the method comprising
creating BRS blocks, wherein each BRS block comprises a respective group of adjacent subcarriers for the BRS belonging to a port of the beam, wherein the BRS belonging to the port is carried over each subcarrier in the respective group of adjacent subcarriers of each BRS block;
transmitting the BRS blocks spread over a bandwidth in a same Orthogonal Frequency Division Multiplexing (OFDM) symbol; and
obtaining information based on a combination of two or more measurement results, wherein each one of the two or more measurement results corresponds to a different one of the BRS blocks disposed in the same OFDM symbol.

2. The method of claim 1, wherein the transmitting the BRS blocks spread over the bandwidth comprises repeatedly transmitting the BRS blocks over a system bandwidth in the same OFDM symbol.

3. The method of claim 1, wherein the transmitting the BRS blocks spread over the bandwidth comprises transmitting the BRS blocks spaced apart in a frequency domain with a space in a middle of the bandwidth for other signals.

4. The method of claim 1, wherein the BRS blocks have different initialization seed values for a reference signal sequence of the respective BRS block.

5. The method of claim 1, wherein a further group of adjacent subcarriers in each BRS block is allocated for a different BRS of a different beam.

6. The method of claim 1, wherein the transmitting the BRS blocks comprises broadcasting the BRS blocks.

7. The method of claim 1, wherein the radio-network node comprises a multiple antenna system, which multiple antenna system supports a total number of beams; and the creating the BRS blocks comprises creating the BRS blocks, wherein each BRS block comprises a number M of groups of adjacent subcarriers, wherein each group out of the number M of groups comprises a group of adjacent subcarriers carrying a corresponding BRS of a respective beam, and wherein the number M of groups corresponds to the total number of beams supported by the multiple antenna system.

8. A method performed by a wireless device for measuring Beam Reference Signals (BRS) of a beam transmitted by a radio-network node in a wireless communications network, the method comprising
receiving BRS blocks spread over a bandwidth in a same Orthogonal Frequency Division Multiplexing (OFDM) symbol, wherein each BRS block comprises a respective group of adjacent subcarriers for the BRS belonging to a port of the beam, wherein the BRS belonging to the port is carried over each subcarrier in the respective group of adjacent subcarriers of each BRS block;
generating two or more measurement results, wherein each one of the two or more measurement results corresponds to a different one of the BRS blocks; and
obtaining information based on a combination of the two or more measurement results, wherein each one of the two or more measurement results corresponds to a different one of the BRS blocks disposed in the same OFDM symbol.

9. The method of claim 8, wherein the receiving the BRS blocks spread over the bandwidth comprises receiving the BRS blocks repeatedly transmitted over a system bandwidth in the same OFDM symbol.

10. The method of claim 8, wherein the receiving the BRS blocks spread over the bandwidth comprises receiving the BRS blocks spaced apart in a frequency domain with a space in a middle of the bandwidth for other signals.

11. The method of claim 8, wherein the BRS blocks have different initialization seed values for a reference signal sequence of the respective BRS block.

12. The method of claim 8, wherein each received BRS block comprises a further group of adjacent subcarriers allocated for a different BRS of a different beam.

13. The method of claim 8, wherein each received BRS block comprises a number M of groups of adjacent subcarriers, wherein each group out of the number M of groups comprises a group of adjacent subcarriers carrying a corresponding BRS of a respective beam, and wherein the number M of groups corresponds to a total number of beams supported by a multiple antenna system, which multi antenna system is comprised in the radio-network node.

14. A radio-network node for handling Beam Reference Signals (BRS) of a beam transmitted by the radio-network node in a wireless communications network, the radio-network node comprising:
a processing unit, and
a memory comprising instructions executable by the processing unit, wherein the instructions are configured to cause the radio-network node to:
create BRS blocks, wherein each BRS block comprises a respective group of adjacent subcarriers for the BRS belonging to a port of the beam, wherein the BRS belonging to the port is carried over each subcarrier in the respective group of adjacent subcarriers of each BRS block;
transmit the BRS blocks spread over a bandwidth in a same Orthogonal Frequency Division Multiplexing (OFDM) symbol; and
obtain information based on a combination of two or more measurement results, wherein each one of the two or more measurement results corresponds to a different one of the BRS blocks disposed in the same OFDM symbol.

15. The radio-network node of claim 14, being further configured to repeatedly transmit the BRS blocks over a system bandwidth in the same OFDM symbol.

16. The radio-network node of claim 14, being further configured to transmit the BRS blocks spaced apart in a frequency domain with a space in a middle of the bandwidth for other signals.

17. The radio-network node of claim 14, wherein the BRS blocks have different initialization seed values for a reference signal sequence of the respective BRS block.

18. The radio-network node of claim 14, being further configured to allocate a further group of adjacent subcarriers in each BRS block for a different BRS of a different beam.

19. A wireless device for measuring Beam Reference Signals (BRS) of a beam transmitted by a radio-network node in a wireless communications network, the wireless device comprising:
a processing unit; and
a memory comprising instructions executable by the processing unit, wherein the instructions are configured to cause the wireless device to:
receive BRS blocks spread over a bandwidth in a same Orthogonal Frequency Division Multiplexing (OFDM)

symbol, wherein each BRS block comprises a respective group of adjacent subcarriers for the BRS belonging to a port of the beam, wherein the BRS belonging to the port is carried over each subcarrier in the respective group of adjacent subcarriers of each BRS block;

generate two or more measurement results, wherein each one of the two or more measurement results corresponds to a different one of the BRS blocks; and obtain information based on a combination of the two or more measurement results wherein each one of the two or more measurement results corresponds to a different one of the BRS blocks disposed in the same OFDM symbol.

20. The wireless device of claim 19, being further configured to receive the BRS blocks repeatedly transmitted over a system bandwidth in the same OFDM symbol.

21. The wireless device of claim 19, being further configured to receive the BRS blocks spaced apart in a frequency domain with a space in a middle of the bandwidth for other signals.

22. The wireless device of claim 19, wherein the BRS blocks have different initialization seed values for a reference signal sequence of the respective BRS block.

23. The method of claim 1, wherein the combination of the two or more measurement results is obtained based on averaging the measurement results.

24. The method of claim 8, wherein the combination of the two or more measurement results is obtained based on averaging the measurement results.

25. The method of claim 1, further comprising:

based on the obtained information, selecting a beam from a set of beams.

26. The method of claim 1, wherein the radio-network node comprises a multiple antenna system supporting a total number of beams, each of the created BRS blocks comprises a number M of groups of adjacent subcarriers, each group out of the number M of groups of adjacent subcarriers comprises a group of adjacent subcarriers carrying a corresponding BRS of a respective beam, and the number M of groups corresponds to a number of beams supported by the multiple antenna system.

* * * * *